P. W. PHILLIPS.
Curtain-Fixtures.
No. 5,858 Reissued April 28, 1874.
FIG. I.
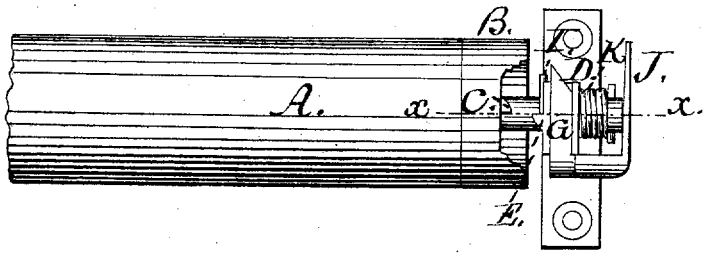
FIG. II.
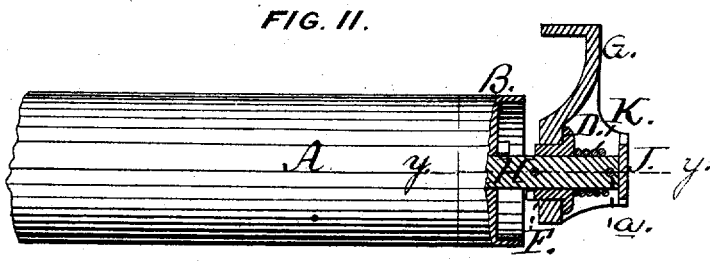
FIG. III.
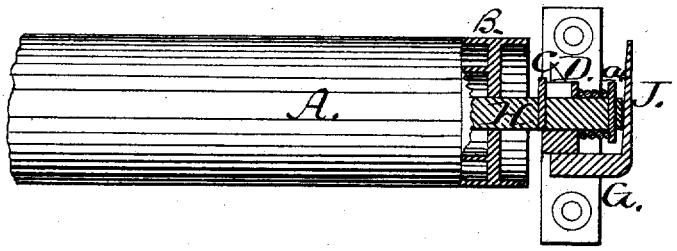
WITNESSES.
W. J. Peyton.
A. H. Norris.
INVENTOR.
Phineas W. Phillips.
Per James L. Norris.
attorney.
AM. PHOTO-LITHOGRAPHIC Co. N. Y. (OSBORNE'S PROCESS.)

UNITED STATES PATENT OFFICE.

PHINEAS W. PHILLIPS, OF SALEM, MASSACHUSETTS, ASSIGNOR, BY MESNE ASSIGNMENTS, TO THE SALEM SHADE-ROLLER MANUFACTURING COMPANY, OF SAME PLACE.

IMPROVEMENT IN CURTAIN-FIXTURES.

Specification forming part of Letters Patent No. 114,036, dated April 25, 1871; reissue No. 5,858, dated April 28, 1874; application filed March 31, 1874.

*To all whom it may concern:*

Be it known that I, PHINEAS W. PHILLIPS, of Salem, in the county of Essex, State of Massachusetts, have invented an Improvement in Curtain-Fixtures, of which the following is a specification:

This invention consists in combining with a shade-roller, possessing a spring for winding up the curtain when it is unrolled, a supplemental spring arranged to automatically engage a clutch or stop for holding the hub or spindle, and preventing the shade-roller spring from unwinding when the roller is removed from its brackets, and when in its brackets the clutch or stop will be always disengaged to allow the free movement of the roller for rolling or unrolling the shade.

In the drawings, Figure 1 is an elevation of the shade-roller and bracket. Fig. 2 represents a section on the line *x x* of Fig. 1, and Fig. 3 a section on the line *y y* of Fig. 2.

A represents the shade-roller provided with a cap or flange, B, which has a lug or projection, C, on its face, and, together with the collar or block D having a lug, E, forms the clutch or stop. The collar or block D is retained in a slot, F, formed in the bracket G, and the shaft H of the shade-roller passes through said collar D, the latter having a slot for the reception of the pin I on the shaft H. This slot allows a slight lateral movement of the collar, and, in connection with the pin I, prevents the shaft H from revolving. Said shaft is confined in place by the upright or arm J on the bracket, and has coiled around it, between the collar D and a pin, *a*, a spring, K, whereby, when the roller is removed from the brackets, the said spring will force the collar D toward the flange or cap B, and, engaging the lugs C E, holding the collar, shaft, and shade-roller in the same position, and preventing the spring from being unwound. The jaws of the slot F are inclined at the top so as to guide the collar D into place between the jaws, thus releasing the clutch or stop when the roller is put into the proper place in the bracket, and allowing the roller to revolve. The collar or block D is shown as being made square, but it may be made round, and the shaft may be held in a slot formed in the upright arm J, the end of the shaft being made square for this purpose, and thus accomplish the same result.

I claim as my invention—

1. The combination, in a shade-roller having a spring to wind up the shade when it has been unrolled, of a clutch automatically operated by a supplemental spring, substantially as described, for preventing the shade-roller spring from unwinding when the roller is removed from its brackets, as set forth.

2. In combination with the shaft or hub of a spring-shade roller, the loose collar D, having a lug, E, the pin I, spring K, and cap B having lug C, all constructed to operate substantially as described.

PHINEAS W. PHILLIPS.

Witnesses:

WM. G. WEBBER,

WALTER K. BIGELOW.